(12) United States Patent
Mazur

(10) Patent No.: US 10,869,813 B1
(45) Date of Patent: Dec. 22, 2020

(54) MEDICATION DISPENSING TRAY ADAPTER AND SYSTEM

(71) Applicant: Robert Gerhard Mazur, Louisville, KY (US)

(72) Inventor: Robert Gerhard Mazur, Louisville, KY (US)

( * ) Notice: Subject to any disclaimer, the term of this patent is extended or adjusted under 35 U.S.C. 154(b) by 0 days.

(21) Appl. No.: 16/537,930

(22) Filed: Aug. 12, 2019

Related U.S. Application Data

(63) Continuation of application No. 15/412,966, filed on Jan. 23, 2017, now Pat. No. 10,406,074.

(60) Provisional application No. 62/388,354, filed on Jan. 21, 2016.

(51) Int. Cl.
| | | |
|---|---|---|
| *A61J 7/00* | (2006.01) | |
| *A61J 1/03* | (2006.01) | |
| *B65D 65/14* | (2006.01) | |
| *B65D 75/32* | (2006.01) | |
| *B65D 83/04* | (2006.01) | |
| *H02J 7/02* | (2016.01) | |
| *B65D 75/58* | (2006.01) | |
| *B32B 7/12* | (2006.01) | |

(52) U.S. Cl.
CPC ............. *A61J 7/0069* (2013.01); *A61J 1/035* (2013.01); *B32B 7/12* (2013.01); *B65D 65/14* (2013.01); *B65D 75/327* (2013.01); *B65D 75/5855* (2013.01); *B65D 83/0463* (2013.01); *H02J 7/025* (2013.01); *B32B 2439/00* (2013.01)

(58) Field of Classification Search
CPC ...... A61J 7/0069; A61J 7/0454; A61J 7/0084; A61J 1/035; B65D 83/0463; G07F 17/0092
See application file for complete search history.

(56) References Cited

U.S. PATENT DOCUMENTS

| | | | | |
|---|---|---|---|---|
| 2,255,331 | A | * | 9/1941 | Pospisil ................... B65D 5/38 206/532 |
| 2,324,228 | A | | 7/1943 | Nash |
| 2,411,471 | A | | 11/1946 | Sherman |
| 2,412,332 | A | | 12/1946 | Hansen |
| 2,780,349 | A | | 2/1957 | Tornberg |
| 2,921,672 | A | | 1/1960 | Ivy et al. |
| 2,968,391 | A | | 1/1961 | Sparks |
| 3,049,224 | A | | 8/1962 | Fredette |
| 3,203,541 | A | | 8/1965 | Rein |
| 3,286,390 | A | | 11/1966 | Guice |
| 3,302,775 | A | | 2/1967 | Finkelston, Jr. |
| 3,327,843 | A | | 6/1967 | O'Meara |
| 3,367,491 | A | | 2/1968 | Dunham et al. |
| 3,393,794 | A | | 7/1968 | Borin |
| 3,410,450 | A | * | 11/1968 | Fortenberry .......... A61J 7/0076 221/7 |
| 3,537,422 | A | | 11/1970 | Moe |
| 3,820,655 | A | * | 6/1974 | La Tourette ....... B65D 83/0445 206/532 |

(Continued)

*Primary Examiner* — Timothy R Waggoner
(74) *Attorney, Agent, or Firm* — Middleton Reutlinger

(57) ABSTRACT

Disclosed is a medication dispensing device adaptable to receive a medication dispensing tray, the tray having a slidable overlapping foil layer to incrementally expose the compartments of the medication dispensing tray. The dispensing device delivers the medication dispensed from the tray compartments to the patient through a funnel and staggered rotatable cup system to individually dispense each of the compartments of the tray.

18 Claims, 7 Drawing Sheets

(56) References Cited

U.S. PATENT DOCUMENTS

| | | | |
|---|---|---|---|
| 4,057,145 A * | 11/1977 | Wray | B65D 83/0445 |
| | | | 206/538 |
| 4,169,531 A | 10/1979 | Wood | |
| 4,660,991 A | 4/1987 | Udo | |
| 4,664,262 A | 5/1987 | White | |
| 4,693,371 A | 9/1987 | Malpass | |
| 4,763,810 A * | 8/1988 | Christiansen | A61J 7/04 |
| | | | 221/15 |
| D310,938 S | 10/1990 | Vigil | |
| 5,046,455 A | 9/1991 | Christiansen | |
| 5,203,472 A | 4/1993 | Levenbaum et al. | |
| D349,850 S | 8/1994 | Leman | |
| 5,724,764 A | 3/1998 | Alsup | |
| 5,755,357 A * | 5/1998 | Orkin | A61J 7/0084 |
| | | | 221/120 |
| 5,915,589 A | 6/1999 | Lim | |
| 5,954,202 A | 9/1999 | Mellon | |
| 6,471,063 B2 | 10/2002 | Askew | |
| 6,594,549 B2 | 7/2003 | Siegel | |
| 6,705,487 B2 | 3/2004 | Kim | |
| 6,779,663 B1 | 8/2004 | Pocsi | |
| 7,048,141 B2 | 5/2006 | Abdulhay et al. | |
| 7,178,688 B2 * | 2/2007 | Naufel | G07F 11/62 |
| | | | 221/13 |
| 7,359,765 B2 | 4/2008 | Varvarelis | |
| 7,451,583 B2 | 11/2008 | Kim | |
| 7,549,268 B2 | 6/2009 | Kim | |
| 7,641,073 B2 | 1/2010 | Kim | |
| 7,669,733 B2 | 3/2010 | Kim | |
| 7,699,173 B2 | 4/2010 | Hession | |
| 7,780,009 B2 | 8/2010 | Casanova | |
| 7,894,656 B2 | 2/2011 | Kim | |
| 7,967,143 B2 | 6/2011 | Paliotta et al. | |
| 8,146,627 B2 | 4/2012 | Mazur | |
| 8,239,214 B2 | 8/2012 | Kim | |
| 8,264,335 B2 | 9/2012 | Dehlin et al. | |
| D686,407 S | 7/2013 | Mazur | |
| 8,581,709 B2 | 11/2013 | Mazur | |
| 8,600,548 B2 | 12/2013 | Bossi et al. | |
| 8,869,984 B2 | 10/2014 | Bellamah | |
| 9,211,233 B2 | 12/2015 | Shavelsky et al. | |
| 9,271,898 B2 | 3/2016 | Flynn | |
| 9,387,153 B1 | 7/2016 | Mazur | |
| 2004/0158350 A1 | 8/2004 | Ostergaard et al. | |
| 2009/0127275 A1 | 5/2009 | Choi | |
| 2009/0277921 A1 | 11/2009 | Angelucci et al. | |
| 2009/0299522 A1 | 12/2009 | Savir | |
| 2010/0000899 A1 | 1/2010 | Burg et al. | |
| 2011/0196538 A1 | 8/2011 | Michael | |
| 2013/0066463 A1 | 3/2013 | Luoma et al. | |
| 2013/0319902 A1 | 12/2013 | Tufi | |
| 2017/0197775 A1 * | 7/2017 | Fagen | B65B 69/0033 |

* cited by examiner

MEDICATION DISPENSING TRAY ADAPTER AND SYSTEM

TECHNICAL FIELD

The present disclosure is directed generally to a medication dispensing device and related system. More particularly, but not exclusively, various systems and apparatus are disclosed herein which relate to providing an adapter to medicating dispensing trays which works in conjunction with a personal medication dispensing system.

BACKGROUND

Daily medication is often organized in dosing packages for ready use by the user and for dispensing in an organized and controlled manner. For example, certain medical conditions or ailments call for certain medication(s) or treatment regimen(s), which may include a variety of pills or medications that are to be taken in certain combination and/or at certain times (e.g., daily, twice per day, every other day, etc.). Often however it is difficult for a person or patient to keep track of and/or remember what pills or medications to take and at what time to take them.

Attempts have been made to help individuals organize and/or use certain items at certain times of day. For example, compartmentalized pillboxes have been developed that contain multiple doses to be taken at different times. However, such devices still require a person or individual to fill them, and to remember to take them at certain times.

As well, medications may be obtained from multiple sources such as mail-order pharmacy or pickup from a local drug store. These medications are then transferred, oftentimes with the aid of a family member or care-giver into pillboxes or medicine trays on a routine basis. Some independent or community pharmacists fill a customer's medicine tray weekly to avoid the confusion and avoid the mistakes a person might experience when loading multiple medications into a tray. Medicine trays filled by a community or independent pharmacy often are required to have a label with tray contents. The community or independent pharmacy often provides services like loading a medicine tray for customers, whereas the chain drug stores typically do not. Most medicine trays are divided into four unique rows of compartments identified as morning, noon, evening, and night with multiple rows associated with the days of the week: Monday, Tuesday, Wednesday, Thursday, Friday, Saturday, and Sunday. The designs of the medicine trays are not standard and thus the size and number of compartments can vary from different suppliers.

Most medicine trays are simply plastic trays with a cover and require a user to pierce the label of a given compartment and either pick the medicine out of the compartment by squeezing the medication with their fingers, or pour the contents into his/her hand. The piercing of this label may be difficult for certain people who are experiencing reduced hand strength caused by arthritis or aging. Oftentimes, opening the trays and individual compartments require knives or scissors to pierce and access the contents of a tray's compartment of medication. The overall size of some of the medicine trays may also be cumbersome when pouring medications into a user's hand, some are not portable given their size, and some of the compartments are made of small plastic compartment-specific lids that are difficult to open.

For example, U.S. Pat. No. 3,820,655 is a container for holding and dispensing individual articles with separable pull tabs associated with four unique columns of contents all maintained in operable pre-pulled closed condition relative to the tray by an associated cover having dispensing apertures aligned to the tray compartments normally closed by the pull tabs. The four pull tabs allow the user to pull the tabs in any order which makes the design only suitable for a single-dose packaged medication, not multiple medications. As an example, if the user pulls the first tab in the first column, the contents are dispensed from a location on the first column. The user then could pull the third tab and dispense from the third column multiple times before selecting the any four of the next tab when it is time to take the dosage. If the columns were labeled morning, noon, evening, night, and the rows were labeled Monday through Sunday, errors in medication could quickly occur given there is no way to control the order of the tabs being pulled. And if there were multiple medications, and unique combinations in the containers on the medicine tray, the four-unique pull tabs without controlled or organized pulling would quickly lead to medication errors. The pull tabs are not flexible given they are made from a single sheet of material described in the embodiment. The dispenser is made from a single sheet of material preferably made of a paper product and is die cut to provide four unique panel areas with one of the four with vacuumed formed cavities to receive the medications. The four main panels with score lines strategically placed allow the design to be folded and heat-sealed to complete the design. There are recessed areas for the four pull tabs to allow the user to pull the tabs to dispense the contents. The large encumbered design makes loading the single-dose medication difficult and cumbersome for the pharmacist as it takes a larger space to fill, fold, and seal.

U.S. Pat. No. 4,763,810 is a medication dispenser for multiple medications using a rotating belt. The belt is designed to rotate under the medication holding compartments and the belt has at least one opening such that the medications are dispensed when the belt openings rotate under the medication. However, multiple rotating belts are required for each row of the tray and results in loss of coordinated control and dispensing of the medication while further requiring the rotating dispensing belt to be interwoven across multiple rows as depicted in the figures.

Thus, there is a need for easy dispensing of the medicine trays in a uniform and automated fashion which does not require the user to open the individual compartments.

SUMMARY

The present disclosure is directed towards dispensing systems and apparatus for sealing a medicine tray and a metered pill dispensing system. The metered pill dispensing system is, in various embodiments, a system that receives a pre-loaded pill tray or tray, containing a pre-determined or individualized assortment and compartmentalization of pills, designed for a particular person's medication regimen. The multiple compartments of the tray may each contain a dose of medication, for example, as prescribed if prescription medication is involved. The pre-loaded tray can be inserted into a tray that aids in the metered dispensing of pills from the tray. The tray may have in some embodiments an actuatable, indexing foil. Actuation or indexing of the foil may cause peeled-off foil to expose the pass through openings of certain compartments of the tray. Furthermore, actuation or indexing of the foil may be controlled (e.g., by an electronic or mechanical device) so that the pill(s) of a given compartment are released or dispensed at a certain, predetermined day and/or time of day.

In other aspects, the system and method include a medication tray and adapter that fits over the medication tray that allows the regular and automated dispensing of the tray contents. The adapter can, in some embodiments, include a multiple layer adapter that includes an overlap foil layer that can be incrementally advanced to expose the openings and compartments of the tray for proper dispensing. The multiple layer adapter may include a carrier layer that bonds over the tray top surface, an overlapping foil layer that can be engaged by a dispensing device to be incrementally advanced and peeled away for row by row dispensing. The tray adapter may further have a top foil protective layer to overlay the overlapping foil layer.

Generally, in one aspect, a metered dispenser system is provided having a tray, an adapter, and housing. The tray is sized and shaped to internally receive a predetermined multi-compartment tray, each compartment of the tray may retain one or more predetermined objects.

The tray may further, in various embodiments, include a readable identifier that identifies the contents of the tray, and/or the readable identifier may be in communication with (or communicated to) a control and/or a mobile device. The mobile device, if used, may be a cell phone and/or a tablet device. A camera may be included for reading the readable identifier of the tray and communicating it to the control and/or the mobile device.

Generally, in various implementations, the present disclosure is directed towards a medication dispensing tray adapter for attachment to a medication dispensing tray, the medication dispensing tray having a plurality of compartments, the medication dispensing tray adapter and medication dispensing tray combined to position into a medication dispensing device, the medication dispensing tray adapter including, a top protective layer having a plurality of pass through openings formed in a plurality of rows and a plurality of columns; an overlapping foil layer having a tab at a first end and an intermediate overlapping fold, the overlapping foil layer slidable relative to the adjacent top protective layer and removably adhesively affixed to an adjacent first adhesive carrier, the first adjacent adhesive carrier disposed opposite the top protective layer to sandwich the overlapping foil layer between first adhesive carrier and the top protective layer; a carrier layer having a plurality of pass through openings and affixed to the adjacent first adhesive carrier; a second adhesive carrier affixed to the carrier layer and having a plurality of pass through openings; wherein the top protective layer, the overlapping foil layer, the first adhesive carrier, the carrier layer and the second adhesive carrier form the tray adapter, the tray adapter confirgurable to adhere to the top surface of a medication dispensing tray.

In some implementations, the tab of the overlapping foil layer extends beyond an edge top protective layer. In other aspects, the overlapping foil layer is continuous from a first end to a second end. In other aspects, the overlapping foil layer intermediate overlapping fold slides between the top protective layer and the first adhesive carrier as the tab is pulled away from the edge of the top protective layer.

Other implementations include the carrier layer having an extension area to receive a label. Alternatively some embodiments may include a plurality of pass through openings of the top protective layer, first adhesive carrier, carrier layer and second adhesive carrier are all aligned. Still other aspects may further include a medication dispensing tray having a top surface and a plurality of compartments, the tray adapter bonded to the top surface of the tray. In such implementations, the plurality of compartments of the medication dispensing tray are aligned with each of the pass through openings of the top protective layer. In still further aspects, the tray adapter may be received within a dispenser system, the dispenser system operable to apply a pulling force on the tab of the foil layer and remove the foil layer from between the top protective layer and the first adhesive carrier.

Other implementations may include a medication dispensing tray adapter for attachment to a medication dispensing tray, the medication dispensing tray having a plurality of compartments, the medication dispensing tray adapter comprising: a top protective layer having a plurality of pass through openings formed in a plurality of rows and a plurality of columns; a continuous overlapping foil layer slidable between the top protective layer and a carrier layer, the continuous overlapping foil layer having a first end and a second end which overlay each other, the first end having a tab, the continuous overlapping foil layer having an overlapping fold intermediate the first end and the second end, wherein the overlapping fold slides towards the first and the second end as a pulling force is applied on the tab of the first end of the overlapping foil layer; the carrier layer having an overlapping extension configurable to receive identification information; wherein the carrier layer has a first surface adjacent the overlapping foil layer and a second surface, the second surface configured to be bonded to a top surface of the medication dispensing tray having a plurality of compartments; wherein the continuous overlapping foil layer acts to seal the plurality of compartments of the medication dispensing tray.

Still further aspects may include a tray adapter wherein the overlapping foil layer slidably engages a lower surface of the top protective layer and has a low tacking adhesive on a lower surface, the low tacking adhesive engaging a top surface of the carrier layer.

Other implementations may have the plurality of pass through openings of the top protective layer being matched with a plurality of pass through openings of the carrier layer and wherein the continuous overlapping foil layer seals the pass through openings. Still further aspects may include the top protective layer, the overlapping foil layer and the carrier layer form the tray adapter, the tray adapter confirgurable to adhere to the top surface of a medication dispensing tray having a plurality of compartments. Still other aspects include wherein the plurality of compartments align with a plurality of flow through openings of the carrier layer and with the plurality of flow through openings in the top protective layer. Still other aspects may include the overlapping extension of the carrier layer extending over and wrapping around the medication dispensing tray when combined.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure.

DETAILED DESCRIPTION

Medication dispensing devices and associated trays are utilized by patients to dispense medication who have increasingly high medication dispensing requirements and rigid dosing times. Such systems and trays however have significant drawbacks in that they are often difficult to use, cumbersome and not sufficiently automated for dispensing in a home environment. In view of the foregoing, various embodiments and implementations of the present disclosure are directed to a modified adapter for medication dispensing trays and a dispensing system for use in combination with the modified tray adapter.

Figure 1:
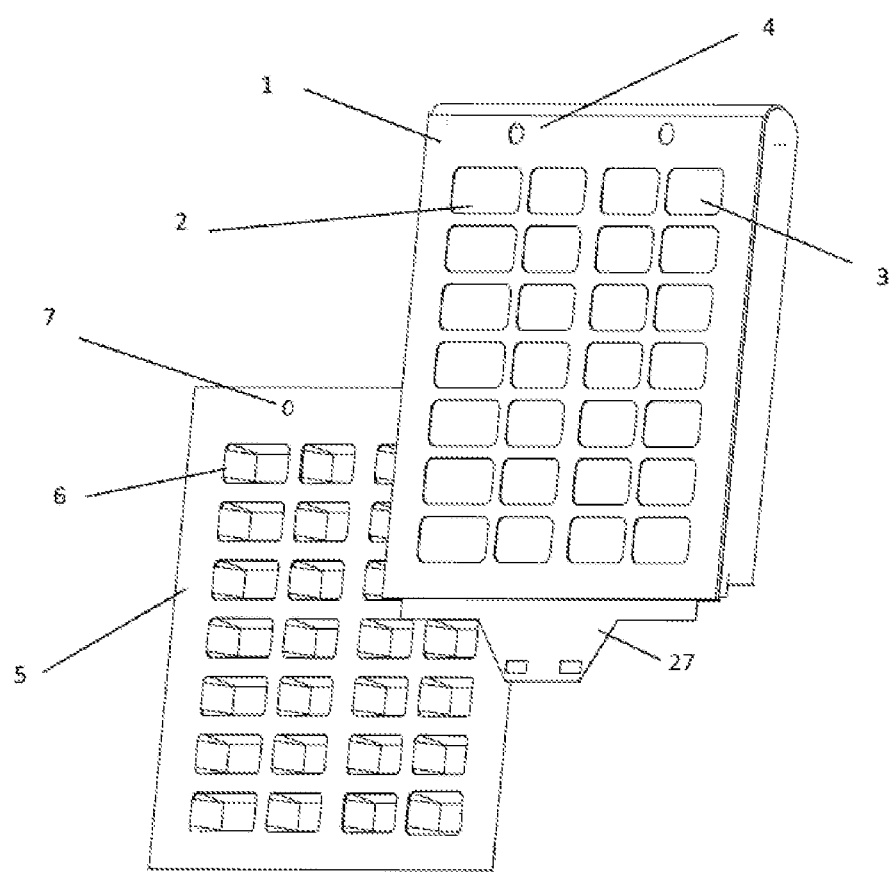
FIG. 1 is a perspective view of an embodiment adapter and a multiple cavity tray example of a device configured with selected aspects of the present disclosure, in accordance with various embodiments.
Figure 2:
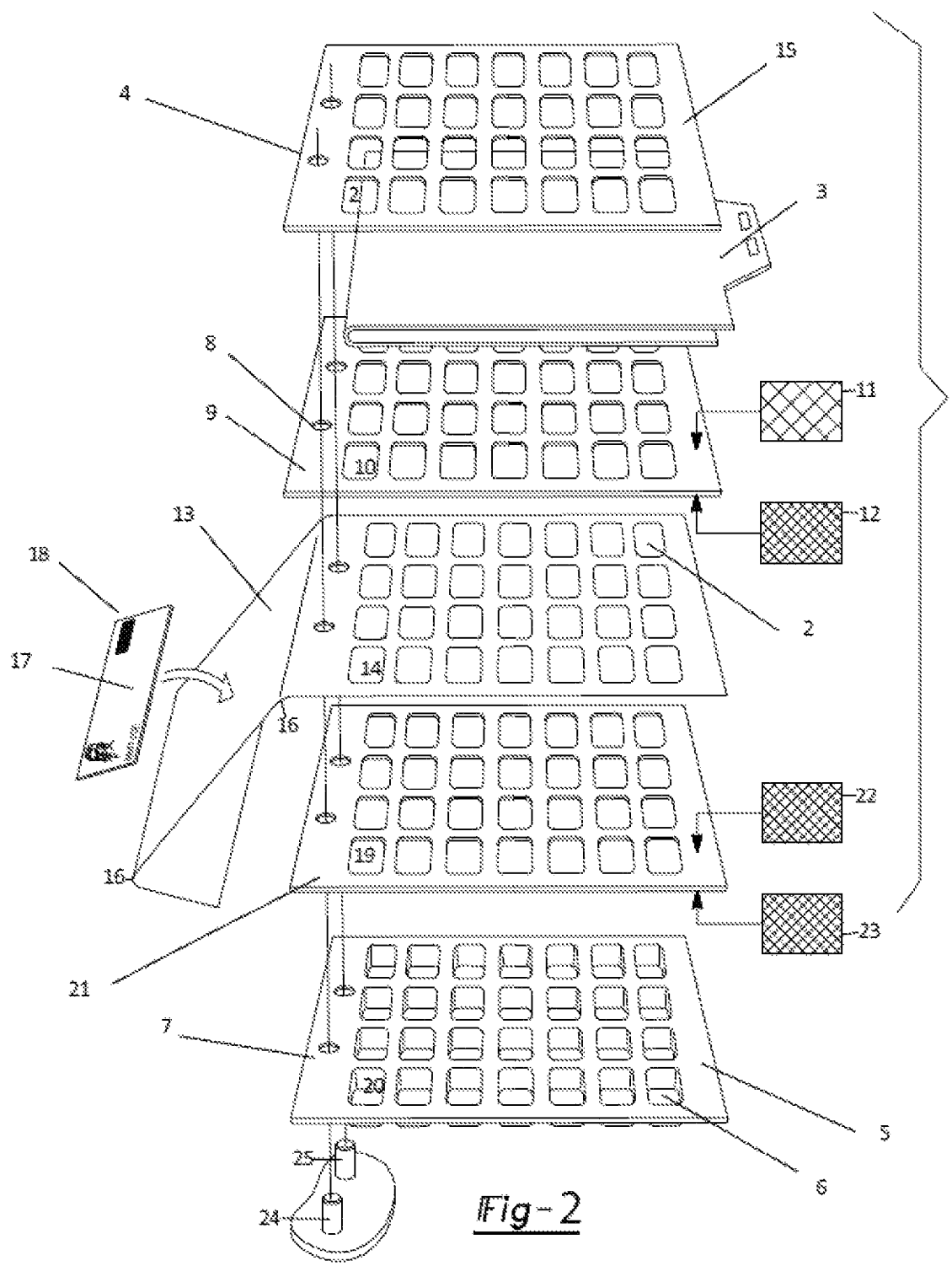
FIG. 2 is an exploded view of the adapter in FIG. 1 in alignment with a tray, in accordance with various embodiments.

Referring initially to FIG. 1 and FIG. 2, one embodiment of a medication dispensing tray adapter 1 is depicted having apertures or pass through openings 2 covered by a foil layer 3 of the multi-layer medication dispensing tray adapter 1. As depicted in one embodiment, the medication dispensing tray adapter 1 is provided to overlay a medication dispensing tray 5, the medication dispensing tray having a plurality of compartments 6 in a number of rows and columns. The dispensing tray adapter 1 is designed to be adhesively applied to the top surface of the dispensing tray and incrementally opened to allow a single row of compartments to become exposed and dispensed. Tab or extension 27, shown in the various Figures, is provided to successively advance opening of individual rows of the adapter and tray so that the row of medication within the tray may be dispensed.

Alignment holes 4 are used to allow for proper positioning of the medication dispensing tray 5 with the tray adapter 1 through utilization of corresponding alignment holes 7 on the tray to insure that multiple compartments 6 on tray 5 align with the multiple openings 2 on dispensing tray adapter 1. Each compartment 6 of the of the medication dispensing tray 5 may contain one or more contents. Contents may include any of a variety of objects or things, including, but not limited to, pills, medications, or the like, or any combination thereof, without limitation. Insofar as the terms pill and/or pillbox, or the like, are referred to herein, such references are for convenience only and do not limit the embodiments or the claims to include or to be used with or for pills.

Medication dispensing tray 5 has compartments 6 which are each aligned with holes 7 as shown in the exemplary embodiment of FIGS. 1 and 2. Alignment holes 4 of the dispensing tray adapter 1 are matched on the multiple layers of the adapter 1 assembly shown in the exploded view of FIG. 2. A double sided adhesive carrier 9 may be provided with corresponding alignment holes and openings having a low-tacking adhesive 11 on an upper surface that bonds with overlapping foil layer 3 and a relatively stronger-tacking adhesive layer 12 that bonds to carrier layer 13. The carrier layer 13 further has a plurality of aligned cutouts 14 that correspond with the openings 2 of the foil protective layer 15. Carrier layer 13 and foil protective layer 15 may be made from, in some embodiments, transparent and recyclable PET plastic sheets or similar material. Overlapping foil layer 3 may in some aspects, be made of a durable and flexible foil or sheet that can be rolled back onto itself in a tight confined space and provides protection from moisture and light.

Second adhesive carrier 21 may also be similarly provided with double sided layering of adhesive applied, an adhesive layer 22 on an upper surface of second adhesive carrier 21 and an adhesive layer 23 on a lower surface of the second adhesive carrier layer 21. Adhesive layers 22, 23 may be a relatively stronger adhesive layer as compared to adhesive bonding layer 11 positioned on the upper surface of the first adhesive carrier 9 stacked between carrier layer 13 and protective layer 15. Both first adhesive carrier 9 and second adhesive carrier 21 may be made of the same material or of differing material to support adhesive bonding of the adjacent layers of the tray adapter 1. As well, both the first and second adhesive carriers 9, 21 may take the form shown in the embodiments depicted or may, in various aspects, be altered to only cover portions of the surfaces in order to properly bond the adjacent layers and/or support the adhesive placed therein. Thus, in some embodiments, either or both of the first and second adhesive carriers 9, 21 may include pass through openings or apertures 10, 19 or may only include border portions, sections or segments, partial contact areas and the like.

In some embodiments, first and second adhesive carriers 9 and 21 may be provided and interposed in between successive layers of the adapter 1. For example, an adhesive carrier 9 may be positioned between the carrier layer 13 and the top foil protective layer 15. The adhesive carrier 9, 21 may be made of various materials such as paper, foil, ptfe, or other material used to provide a base for receiving an adhesive material such as 11, 12, 22, 23, as shown. For example, in some embodiments, adhesive carrier layer 9 may have a plurality of matching pass through openings or apertures 10 and include an upper surface covered with a low tacking adhesive 11. Additionally, in some embodiments, carrier layer 9 may include a lower surface having a stronger adhesive 12 formed thereon for bonding of the carrier 9 with the top surface of the carrier layer 13. Likewise, adhesive carrier 21 may be provided in embodiments wherein the carrier 21 is positioned between the top surface of the tray 5 and the lower surface of the carrier layer 13. The adhesive carrier 21 may similarly have apertures aligned with compartments and openings of the tray and of the carrier layer. Both the upper and lower surface of the carrier 21 may have a stronger tacking adhesive 22, 23 applied so as to strongly bond the carrier layer 13 to the adhesive carrier 21 and to the tray 5.

In other embodiments, the adhesive carriers 9 and 21 may be removed and adhesives applied directly to the bonding surfaces of the corresponding protective layer 15, overlapping foil layer 3, carrier layer 13 and top surface of tray 5. Alternatively, some implementations may include carrier layers in one, both or in combinations of positions as necessary and as the level of adhesive bonding requires.

Overlapping foil layer 3 does not need to extend to the edges of the protective layer 15 or the carrier layer 13 resulting in foil protective layer 15 bonding directly to the edges of carrier layer 13. Thus, the overlapping foil layer 3 may, in implementations, be incrementally and gradually advanced upon itself in between the top foil protective layer 15 and the carrier layer 13 in order to be incrementally advanced and expose successive rows of the medication dispensing tray 5. As the overlapping foil layer 3 is advanced, pull tab or extension section 27 may be rolled up in an automated dispensing apparatus thereby allowing the foil layer 3 to remain out of the way of the dispensing of the medication retained within the try while also maintaining a seal over the yet to be dispensed rows of the dispensing tray 5. Thus, in some embodiments, the overlapping foil layer 3 may be slightly smaller in width than the top foil protective layer 15 and the carrier layer 13. As well, the adhesive layer between the overlapping foil layer 3 and the top foil protective layer 15 and the carrier layer 13 may be of reduced adhesive tackiness to allow relative easy separation of the foil layer 3 from both surfaces as the foil layer 3 is slowly incrementally advanced.

The carrier layer 13 may include a hinge 16 in some aspects allowing for an extension area to place label 17 with information printed on it including but not limited to a barcode 18 to remain on the adapter 1 and be able to be repositioned to allow contents to pass through openings of the respective layers. Label 17 may in some aspects, be adhered to the extension area which acts as a foldable and/or moveable panel. Adhesive layer 21 may be implemented as a high strength tacking adhesive to bond to layer carrier 13 on one side to a top surface of the medication dispensing tray 5. In various embodiments, alignment pins 24 and 25 may be used to align the tray adapter 1 onto the dispensing tray 5 to seal contents in tray. Label 17 and barcode 18 may in some aspects be provided as is necessary in some pharmaceutical dispensing entity. Alignment pins 24, 25 may be used to align adapter 1 onto tray 5 and seal contents within tray 5 compartments 20.

Figure 3:
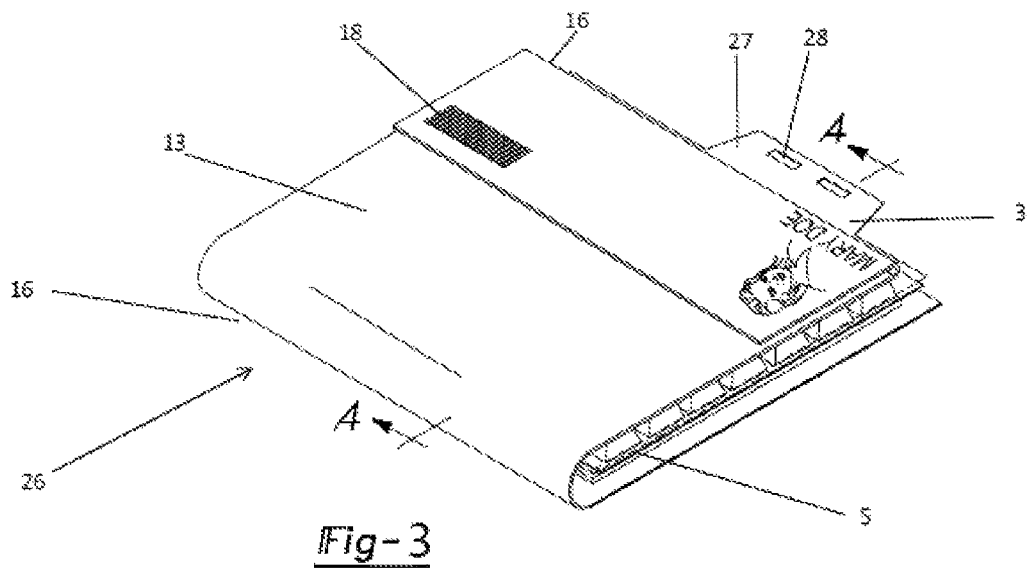
FIG. 3 is a top view perspective of an embodiment of loaded tray of FIG. 1, in accordance with various embodiments.
Figure 4:
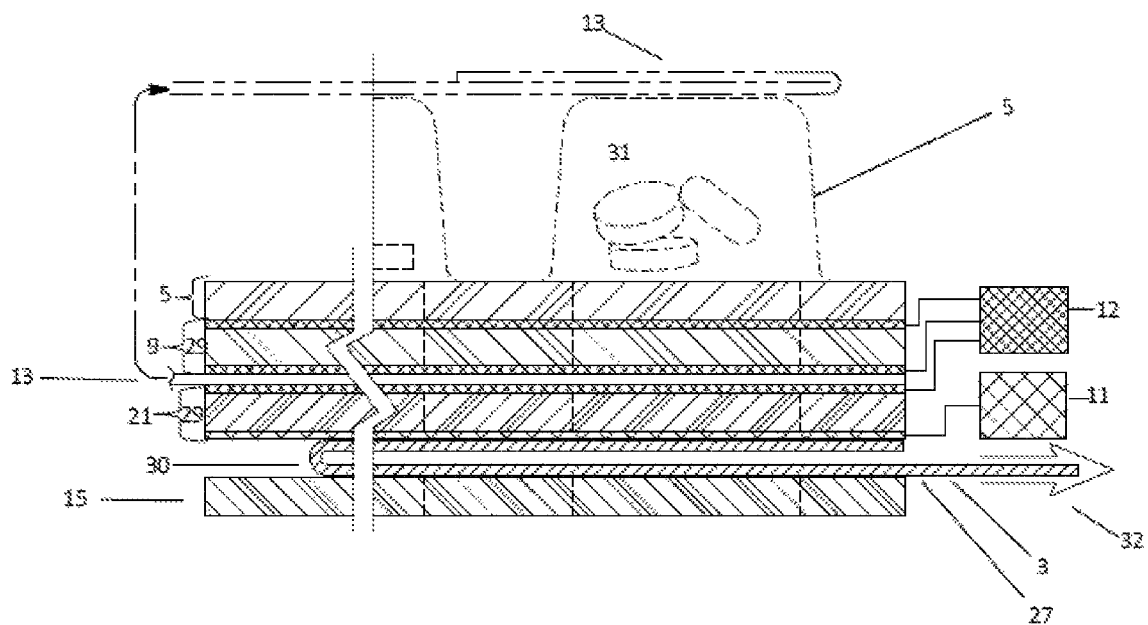
FIG. 4 is an enlarged view of a cross section of the embodiment of FIG. 1, in accordance with various embodiments.

Extension area of the carrier layer 13 on which the label and bar codes may be placed is further depicted variously in the embodiment of FIGS. 3 and 4 wherein the extension overlaps the tray 5 and folds at the hinge or fold line 16. In such implementation, the extension of the carrier layer serves to protect and overlap the entire combined tray and tray adapter, as depicted, while also providing the bar code 18 or other identification information exposed for reading by computer, camera or patient.

Referring to FIGS. 3 and 4, the tray 5 and tray adapter 1 are assembled resulting in a sealed assembly 26. In the assembly 26, the carrier layer 13 is rotated and folded at the hinges 16 to display information barcode 18 and or label 17. Overlapping foil layer 3 and extension tab 27 extends beyond the assembly 26 for pulling foil 3 through the assembly 26 thereby exposing and dispensing successive rows of compartments of the tray 5. Cutouts 28 formed on the extension tab 27 allow for mechanical engagement to assist in advancing and removing the foil 3.

FIG. 4 reveals the enlarged cross section with contents 31 in the tray compartments 20. To aid in protecting removable foil 3, the foil is positioned between carrier 13 and foil protective layer 15. The flexible foil 3 folds back on itself at an overlapping fold/bend line 30 and when extension tab 27 is pulled in direction 32, overlapping fold 30 moves in the direction of the pulled force direction 32. The low-tactile adhesive 11 seals and protects contents 31 in the tray 5 and allows the foil 3 to be removed without depositing any residue. Thus the overlapping foil 3 has a tab 27 at a first end and, due to the overlapping fold 30, has an upper layer and a lower layer with the intermediate overlapping fold 30 interposed therebetween. Overlapping foil 3 may, in implementations, be continuous foil from end to end in order to properly seal the compartments of the tray 5.

As overlapping fold 30 advances down successive rows of the tray 5, contents are dispensed out of tray 5. In various embodiments, adhesive layers 21 and 9 may have a thin carrier substrate made of clear polypropylene 29 or similar material.

In use, the sealed assembly 25 of the combined dispensing tray adapter 1 and medication dispensing tray 5 may be provided for controlled and successive dispensing of the individual rows of tray compartments 6. Such successive opening of the rows of the compartments of the tray may be effected by pulling on the tab or extension 27 so that the foil layer 3, sandwiched between the protective layer 15 and the carrier layer 13, is slowly peeled away to expose the compartment openings in each layer and in the tray. Pulling force on the tab 27 causes the overlapping fold 30 to slowly advance towards the end of the tray thereby exposing successive rows of openings and compartments and allowing the compartments to be emptied. The pulling force applied to the tab 27 may be manual or may be automated.

Figure 5:
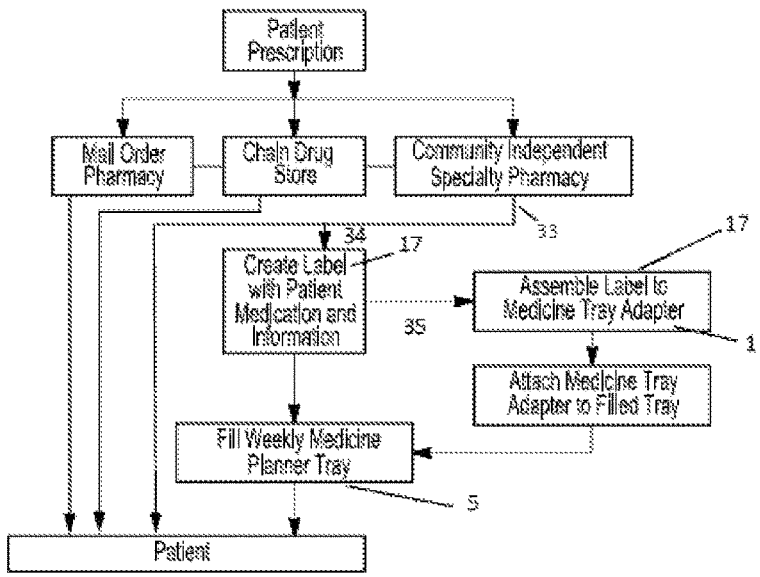
FIG. 5 is a flow diagram for the method of having a patient obtain a filled tray, in accordance with various embodiments.

FIG. 5 depicts an exemplary flow diagram of how a patient obtains medication for the tray 5. From the specialty, independent, community pharmacy path 33 34, a medicine tray 5 is filled. A label 17 may be created to identify the contents of the filled tray 5 and patient identification information. In path 35, a pharmacist may utilize existing equipment, processes, and labels to assemble the tray 5 and tray adapter 1. Alternatively, at step 35 the source may add label 17 and adapter 1 to the tray 5 allowing a sealed system or sealed assembly 26 to be delivered to the patient.

Figure 6:
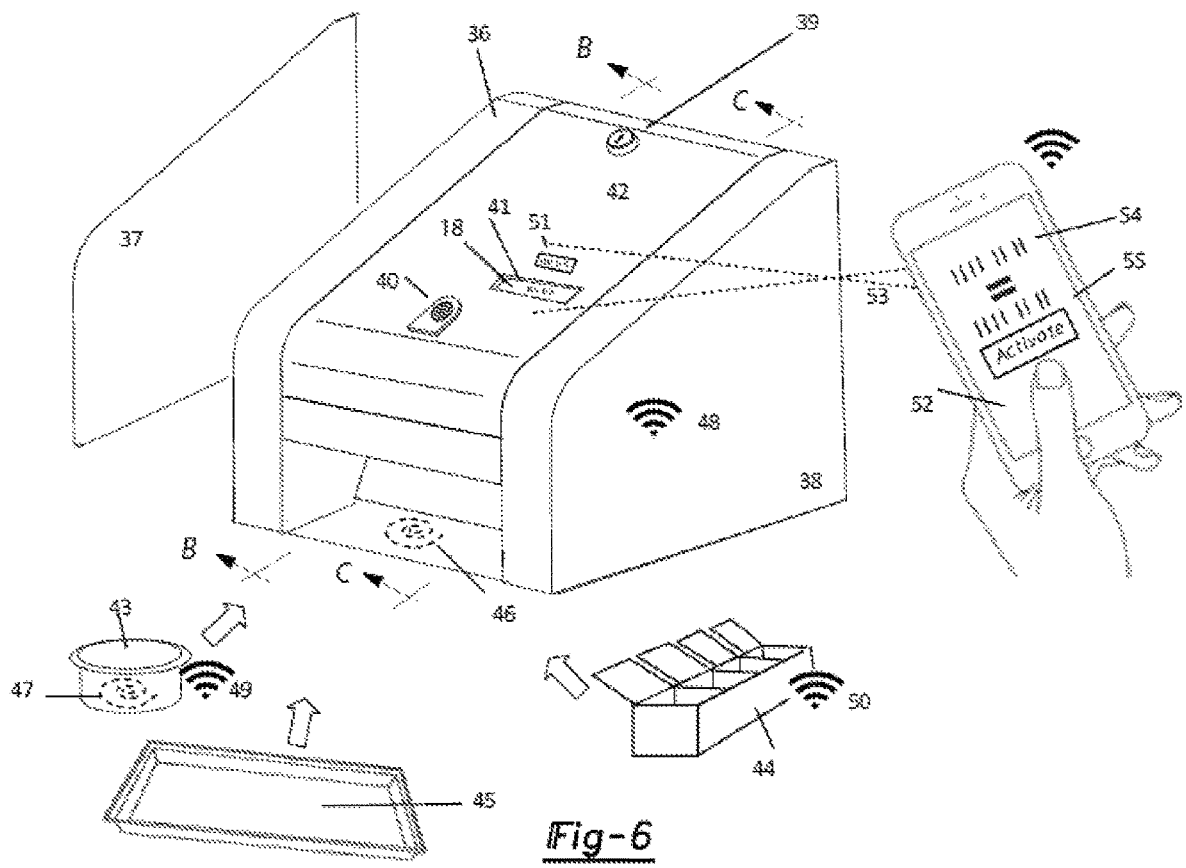
FIG. 6 is a perspective view of an exemplary dispensing system of the present disclosure, in accordance with various embodiments.

FIG. 6 depicts an exemplary medical products metered dispenser system 36 with removable side panels 37, 38, a lockable key 39 to maintain the tray support 42 in a locked and closed condition. The dispenser may, in some aspects, include a fingerprint scanner 40 to match the individual with the medication placed in tray 5 held within the dispenser system 36. Such security features may be used, in some embodiments, to validate the correct user is using the dispenser by matching matches contents found on barcode 18 which is visible through a transparent window 41 on the movable/rotatable tray support 42.

The sealed assembly 26 containing the tray 5, medication and the adapter 1 may be placed into the metered dispenser in order to allow the metered dispenser to dispense the medication contained within the tray on a regular schedule. As described herein, the sealed assembly may be installed into the metered dispenser 36 which may then, on a timed and controlled basis, automatically advance the foil layer 3 of the adapter to dispense a row of medication positioned within the compartments of the tray 5. The metered dispenser 36 may include various electronic control circuitry such as memory, a microprocessor and stored software, to control not only the timely dispensing of the medication but also communications and other aspects defined herein.

Figure 7:
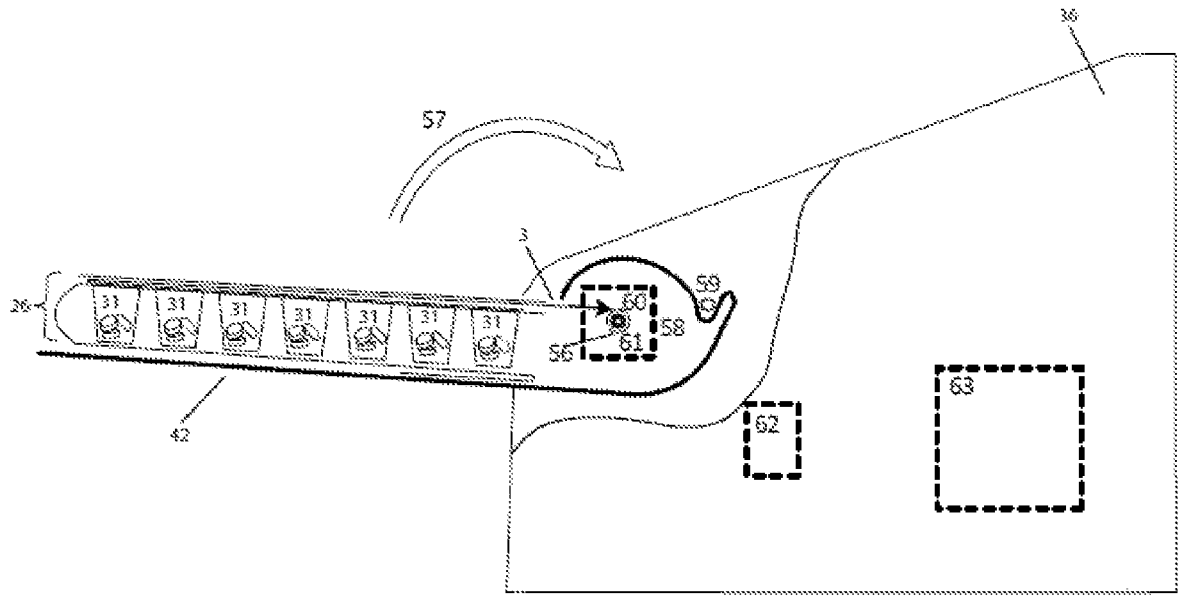
FIG. 7 is a side sectional view of an exemplary dispensing system of the present disclosure, in accordance with various embodiments.

FIG. 7 depicts an exemplary cross section -B- with sealed assembly 26 mounted on the rotatable tray support 42 of dispenser 36. Once the sealed assembly 26 is positioned onto support 42, foil 3 at tab 27 may be affixed foil puling bar 56. Foil 3 may be alternatively affixed to the pulling bar 56 via mechanical attachment, magnetic affixation, adhesives, or through loading the foil 3 through a slot and turning axle 56. Once the foil 3 is attached to the pulling bar 56, rotatable tray support 42 may be rotated 57 into the closed and operating position as shown in FIG. 6. Rotatable tray support 42, foil pulling bar 56, and stepper motor 58 may share the same axis of rotation 61. Stopping peg 59 may also be provided to prevent over rotation of the tray support 42.

During operation, tab 27 of the foil layer 3 within the sealed assembly 26 allows the pulling bar 56, rotated by stepper motor 58, to slowly advance the foil layer 3 thereby removing the foil layer 3 from over the compartments and allowing the contents of the tray compartments to be dispensed by the dispenser 36. As is depicted, as pulling bar rotates clockwise in the FIG. 7, the foil layer 3 is folded back further upon itself and collected around the pulling bar rotation axis. Dispenser 36, when instructed by internal control systems, rotates the pulling bar which causes the foil layer 3 to be removed from sealing engagement of the compartments and material 31 depicted, as the sealed assembly 26 is positioned inverted within the dispenser 36, the contents fall into the dispenser for dispensing.

When filling a cup, two additional motors 62 and 63 may be utilized in various alternative embodiments in dispensing contents 31 such as for rotating cog cups 67 and/or applying movement to a dispensing belt, described further herein.

Figure 9:
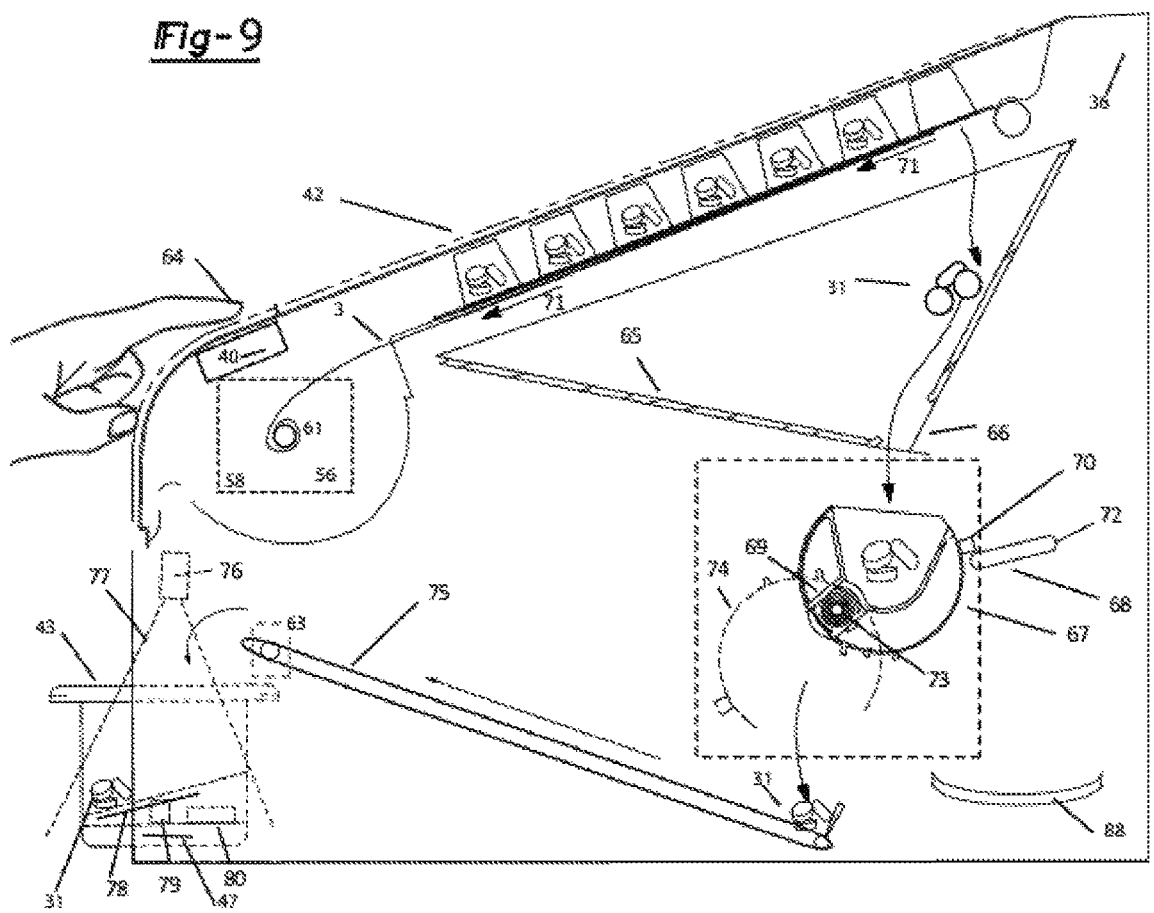
FIG. 9 is a side sectional view of an exemplary dispensing system of the present disclosure, in accordance with various embodiments.

FIG. 9 depicts an exemplary cross section -C- of on embodiment of dispenser 36 with rotatable tray support 42 rotated about motor 58, pulling bar 56, common axis 61 and in the closed and operational position. The dispenser may, in some implementations, operate with a fingerprint scanner 40 and approved fingerprint 64. Once activated, motor 58 may rotate pulling bar 56 rotational axis 61 to pull foil 3 downward in direction 71. The foil wraps around pulling bar 56 as it rotates and advances the foil away from the tray. Motor 58 will stop turning after a programmed number of rotations which is known for adequate movement of the foil and to properly dispense the entire row of medication within the compartments. The tray contents 31 will then fall onto dispenser funnel 65 and towards funnel opening 66.

Figure 12:
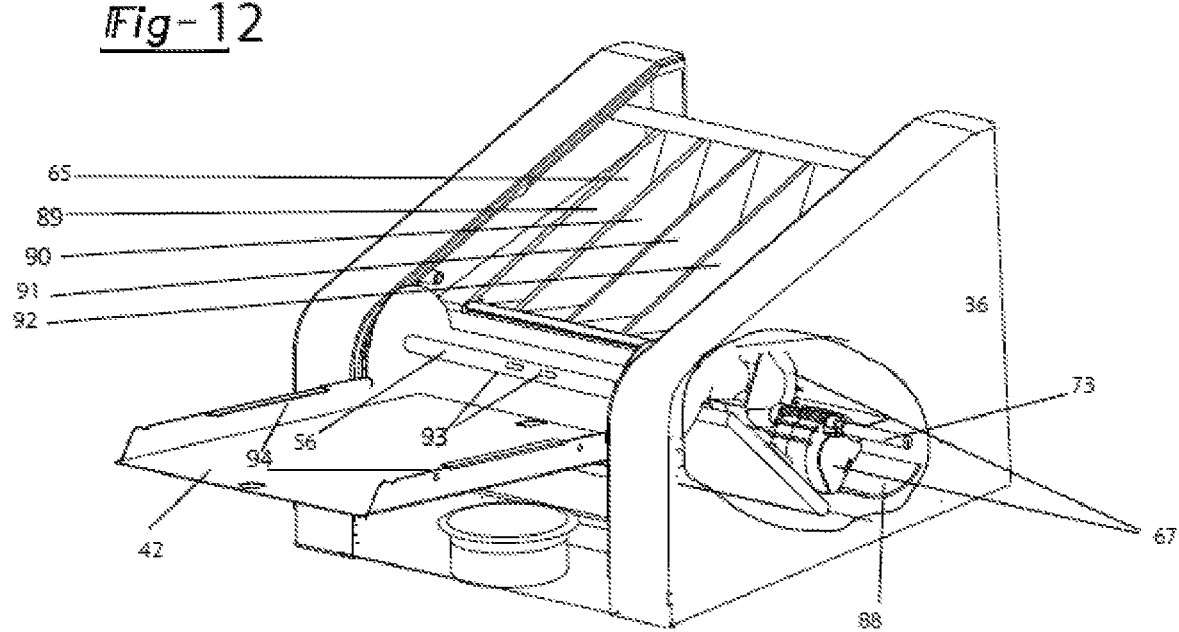
FIG. 12 is a front view of an exemplary dispensing system of the present disclosure with interior portions viewable, in accordance with various embodiments.

Below the directional funnel are positioned a plurality of cog cups 67. The cog-cubs are aligned with the funnels so that each compartment of the tray is dispensed into a unique funnel and then to a unique and individual cog cup, as depicted in FIG. 12. The medication in each compartment of the tray is thus individually deposited into corresponding unique funnel/directional dispenser and then to individual and unique cog-cups 67. Funnels are utilized for depiction purposes in the embodiments but any directional dispensing structure may be utilized to individually collect the contents of the container compartments into individual cups 67.

In the various implementations shown, contents 31 of the individual tray compartments are deposited into individual cups 67. The dispenser and cups are designed such that contents 31 may be either dispensed to the patient through the front of the dispenser or, in the alternative, if a dosage is missed, the contents for the missed dose may be dispensed out of the tray but retained within the dispenser housing. To effectuate such dual dispensing implementation, the cups 67 are positioned along a rotational rod 73 axis and may rotate in either clockwise or counter-clockwise direction. For dispensing to the patient, in the embodiment shown in FIG. 9, the cup rotates in the counter-clockwise direction so that the contents dispense onto belt 75 for emptying into cup or other patient dispensing device. Alternatively, if a dose is missed, after releasing the contents from the tray to the cup 67, the cup may rotate in the clockwise direction to dispense contents 31 into a holding area. Cups 67 are rotated by rod 73 in conjunction with position of tabs 83, 84, 85, 86 to allow for sequential rotation of cups in coordinated fashion. Thus, staggered rotational positioning of the tabs in combination with the off-axis non-central rotational point of the individual cups allows for the staggered dispensing of the individual cup contents at differing times during the day.

As an example, the entire row of tray compartments 20 may be opened by the dispenser at the beginning of the day by advancing the foil around the pulling bar 56. Each individual compartment 20 dispenses into a unique cup 67 which are all held in an upright position as depicted in FIG. 9. The dispenser is ready to begin dispensing each cup as needed for proper dosing throughout the day. The dispenser 36 and internal controller can notify the patient of a medication dispensing time. In some embodiments, the dispenser will not dispense the medication until proper identification of the patient at the dispenser through biometric identification or other patient information entry. Once the proper patient is identified, the dispenser will dispense the contents of one cup for that time period by rotating rod 73 on which the cups are mounted. Due to staggered positioning of the cogs on each cup 67, the first cup at one end of the rod may dispense its contents through counter-clockwise rotation of the rod 73. Once empty, at the next dispensing time, rod 73 may continue rotating in the same direction for dispensing of the next cup in line mounted on the rod. Because the cogs of each cup are staggered as shown, rotational dispensing of the first cup via the rod 73 will not rotate the next in line cup. Continued rotation of the rod 73 at the next dispensing time will similarly cause the second cup to eventually be rotated when contacted by the first cup off-centered tab 85. Such similar staging and staggering of the tabs with adjacent cups allows for the sequential and staggered dispensing of the cups throughout the day.

Alternatively, if a dose is missed, for example, the third dosing cup is required to be dispensed by the second cup was never dispensed, the dispensing system and dispenser 36 may keep track of the status of the cups and whether they have been dispensed. The second cup being still full of contents, the dispenser will rotate the rod clockwise in order to retain the contents 31 in a holding area of the dispenser before dispensing the contents of the third cup to the patient. Thus, rod 73 may rotate clockwise until the second cup rotates in similar fashion by virtue of the first cup tabs contacting corresponding location tabs on the second cup, and the second cup dispenses into the holding area. The dispenser then begins counter-clockwise rotation of the rod to dispense the third cup into the proper patient dispensing area.

In such implementations, the plurality of cog-cups 67 can be pre-loaded at the beginning of the day and sequentially displaced for dispensing throughout the day in a controlled manner.

In the embodiment depicted, cog-cup 67 has an axis of rotation that is off-centered thereby forming eccentrics at each cup 67. In some implementations, the cups may be positioned off-centered to be somewhat unbalanced for ready control and rotation in either the clockwise or counter-clockwise direction. In some implementations, the cog-cup 67 may rest in the up-position, as depicted, which is the receiving position, and maintained in such position by prong 70. Prong 70 may rest on the cross member 72 that spans the width of dispenser 36. Cross member 72 may be flexible to allow each cog-cup 67 to rotate and for prong 70 to rotate past cross member 72.

Stepper motor 62 may be operable to drive multiple cog-cups assembled onto the same rod 73. When the motor 62 rotates in the forward direction 71 transferring contents 31 to a conveyor belt 75 driven by motor 63 to transfer contents 31 into cup 43 or other medication receiving device. In some implementations, dispenser 36 may have an IR camera 76 with a focal angle 77 to see contents in 31. A reflective IR tape 78 may also be utilized to assist in camera 76 visualizing contents 31 in cup 43. In variations, cup 43 may have a battery charging inductive coil 47 to wirelessly charge battery 80. Cup 43 may further have a position sensor 79 to ensure proper positioning for dispensing of medications.

Figure 10:
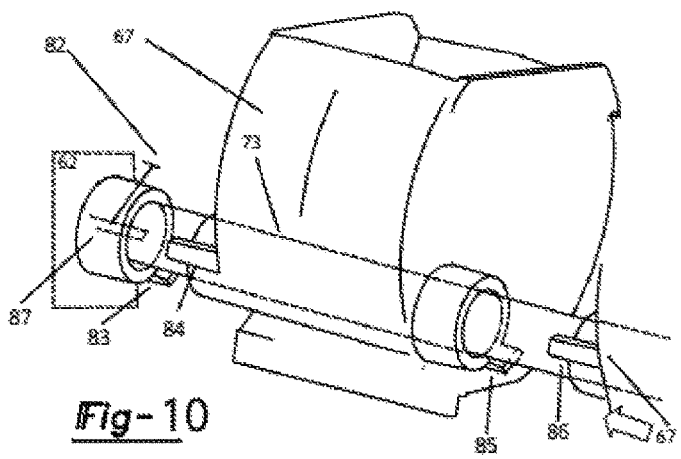
FIG. 10 is an exemplary enlarged perspective view of a cog cup for use in the dispenser of the present disclosure, in accordance with various embodiments.

FIG. 10 depicts an exemplary cog-cup 67 with rotational motor 62. Motor 62 may be connected to rod 73 through set screw 82 or similar structure. In the presented implementation, motor 62 controls and turns multiple cog-cups 67 through mechanical engagement of tabs 83, 84, 85 and 86. All cog-cups 67 may have similar construction thereby positioning tab 84 aligned with the next cog-cup 67 tab 86. Each of the cog-cups may further have an off-centered tab 85 that engages tab 86 of the adjacent cup when rod 73 is rotated. Motor 62 may be affixed to the motor drive shaft affixing motor-adapter 87 to rod 73. As the motor turns, motor-adapter tab 83 engages cog-cup tab 84 thereby turning cog-cup to the forward or reverse direction. Tab 85 rotates while the cog-cup 67 is moving and tab 85 engages the next cog-cup tab 86. Multiple cog-cups maintained adjacent to each other to provide motion when the motor turns via mechanical engagement of the tabs 83, 84, 85, 86.

Figure 11:
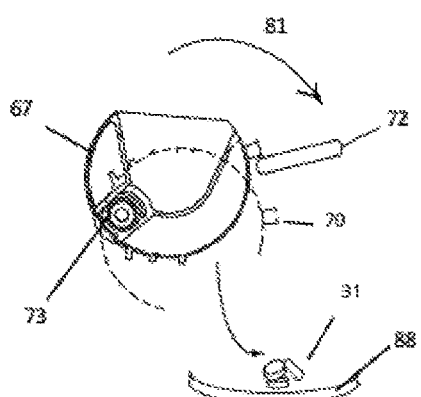
FIG. 11 is an exemplary side view of the cog cup of FIG. 10, in accordance with various embodiments.

As shown in FIG. 11, when the motor 62 rotates in the clockwise direction 81, prong 70 passes cross member 72 leading to contents 31 falling onto a fixed holder 88 in dispenser 36 thus maintaining the contents in a non-dispensed holding area.

Figure 13:
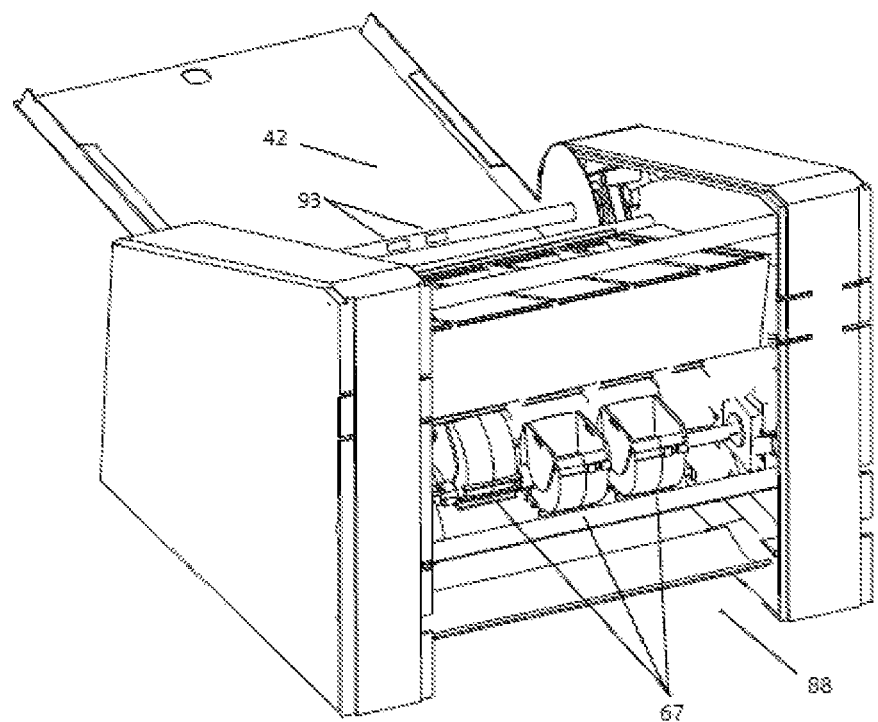
FIG. 13 is a rear perspective view of an exemplary dispensing system of the present disclosure with interior portions revealed, in accordance with various embodiments.

FIGS. 12 and 13 are front and rear orthogonal view of one implementation of dispenser 36 showing funnel 65 or other content directional structure having four separated funnels 89, 90, 91, 92, which align to four cog-cups 67. Pulling bar 56 is also shown with the two locator pegs 93 to locate and attach the foil 3 tab 27 thereto. Inwardly extending extensions 94 on the tray support structure hold tray and adapter assembly 26 on to tray support 42.

In some embodiments, dispenser 36 may dispense medication into electronic or non-electronic cup 43, an electronic or non-electronic pillbox 44 or basic tray 45. Dispenser 36 may also include, in various embodiments, an electrical coil 46 which when aligned with the coil 47 of an electronic cup 43, or pillbox 44, allows inductive wireless charging of the rechargeable battery packaged inside the cup 43 or pillbox 44 as well as verification of the positioning of such devices in the dispensing area of the dispenser.

In aspects, dispenser 36 may also include wireless data uploads and downloads from wireless signal 48 to wireless signals from the cup 49 and wireless signal from the pillbox 50.

In various implementations, the electronic metered dispensing system 36 may include a barcode 51 assigned to a user or patient which may be permanently affixed onto dispenser 36 rotatable tray support 42. Dispenser 36 may wirelessly transmits data to wireless devices 52 that has cameras and the like for photograph/pictures 53, the dispenser having software and program instructions to compare items in the picture, namely barcodes 54, 55 of medication orders, patients, dispenser ids and the like. For example, when barcodes 51 and 18 on the dispenser 36 match respectively with barcodes 54, 55 software on the wireless device 52 may activates the dispenser 36 to dispense contents based on alarms and fingerprint scanning approval.

Alternatively, if barcodes 51 and 18 on the dispenser 36 fail to match, software on the wireless device 52 may be programmed to not activate the dispenser 36 to dispense contents.

Figure 8:
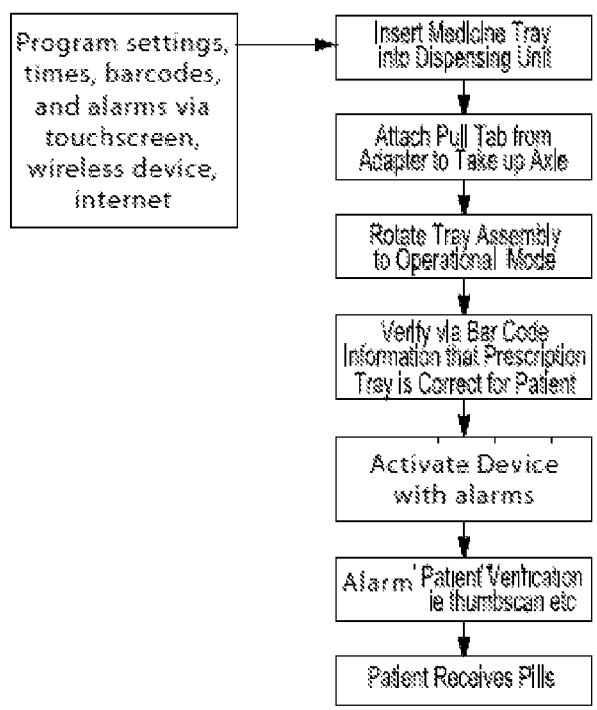
FIG. 8 is a flow diagram for use of the dispensing system of the present disclosure, in accordance with various embodiments.

As outlined in FIG. 8, a flow diagram for utilizing the dispenser is shown. As listed, program settings, times, barcodes and user id information may be stored in the dispenser via electronic communication, from a local source or from other communication sources. Such information in some embodiments may also be directly entered into the device through a user interface. Initially, the sealed assembly 26 is inserted into the dispensing unit 36. The tab 27 from the sealed assembly is attached to the pulling bar. The rotatable tray support may then be rotated into the closed position to place the dispenser in operational mode. Next, the system may verify bar code information that the prescription tray 5 is correctly identified and matched with patient or dispenser id. The device may then be activated with various sensors and alarms and also utilized patient identification using biometric identifiers such a fingerprint verification. Finally, the dispenser may after verification of patient identity, dispense pills.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A medication dispensing device for dispensing medication held within a medication dispensing tray, the medication dispensing tray having a plurality of compartments, the medication dispensing tray positioned in the medication dispensing device, comprising:
    a plurality of funnels positioned below an installed medication dispensing tray, each of the plurality of funnels aligned with a respective one of a plurality of rotational cups, each of the plurality of the funnels dispensing medication into the respective one of the plurality of rotational cups;
    each of the plurality of rotational cups positioned along a rotational rod, the rotational rod rotated by a motor;
    the dispensing device having a pulling bar affixable to a foil layer on the dispensing tray to apply a pulling force on the foil layer and remove the foil layer from the dispensing tray;
    the dispensing tray having a top surface and a plurality of compartments, and a top protective layer having a plurality of pass through openings formed in a plurality of rows and a plurality of columns matching a plurality of openings in the dispensing tray, the foil layer slidable relative to the dispensing tray, and positioned between the top protective layer and the dispensing tray top surface;
    wherein each of the rotational cups individually dispenses from the medication dispensing device.

2. The dispensing device of claim 1 wherein the pulling bar is rotated by a second motor to incrementally remove the foil layer from the dispensing tray.

3. The dispensing device of claim 1 wherein the plurality of rotational cups are rotatable about a point which is an off-axis non-central rotational point.

4. The dispensing device of claim 3 wherein the plurality of rotational cups are in staggered rotational relationship on the rotational rod and receive the dispensed contents of the medication dispensing tray.

5. The dispensing device of claim 4 wherein each of the plurality of rotational cups has a tab, the plurality of tabs in staggered rotational relationship relative to an adjacent cup for staggered dispensing of medication from each respective cup.

6. The dispensing device of claim 1 wherein the device includes a dispensing area having an inductive wireless charging coil.

7. The dispensing device of claim 6 herein the charging coil aligns with a rechargeable dispensing cup.

8. The dispensing device of claim 1 wherein each of the respective rotational cups is positioned over a belt, the belt rotatable to dispense medication into a dispensing area.

9. The dispensing device of claim 8 wherein the dispensing area includes a camera to visualize contents of dispensed medication.

10. The dispensing device of claim 1 wherein the dispenser has at least one removable side panel.

11. The dispensing device of claim 9 further including a finger print reader to match an individual with the dispensing tray in the dispensing device.

12. The dispensing device of claim 1 wherein the dispensing device has a dispensing device identifier stored in a memory, the medication dispensing tray has a bar code, the dispensing device having a bar code reader, the reader operable to read the bar code on the medication dispensing tray and operable to determine a match of the dispensing device identifier and the bar code on the medication dispensing tray.

13. The dispensing device of claim 1 wherein the dispensing device includes a tray support which rotates about an axis substantially in alignment with the pulling bar.

14. A medication dispensing device for dispensing medication held within a medication dispensing tray, the medication dispensing tray having a plurality of compartments, the medication dispensing tray positioned into the medication dispensing device, comprising:
 a plurality of channels positioned below the medication dispensing tray, each of the plurality of channels aligned with a respective one of a plurality of rotational cups, the channels dispensing medication into the respective one of the plurality of rotational cups;
 each of the plurality of rotational cups positioned along a rotational rod, the rotational rod rotated by a motor;
 wherein each of the rotational cups is in a staggered rotatable relationship with an adjacent one of the plurality of cups, each of the cups having a tab, each adjacent tab on respective adjacent rotational cup rotationally staggered relative to an adjacent tab;
 the dispensing device having a pulling bar affixable to a foil layer on the dispensing tray to apply a pulling force on the foil layer and remove the foil layer from the dispensing tray;
 the dispensing tray having a top surface and a plurality of compartments, a top protective layer having a plurality of pass through openings formed in a plurality of rows and a plurality of columns matching a plurality of openings in the dispensing tray, the foil layer slidable relative to the dispensing tray;
 wherein each of the rotational cups individually dispenses from the medication dispensing device upon rotation of the rotational rod.

15. The medication dispensing device of claim 14 wherein the pulling bar is rotated by a second motor to incrementally remove the foil layer from the dispensing tray.

16. The medication dispensing device of claim 14 wherein the plurality of rotational cups are rotatable about a point which is an off-axis non-central rotational point.

17. The medication dispensing device of claim 14 wherein the plurality of channels are a plurality of funnels.

18. A medication dispensing device for dispensing medication held within a medication dispensing tray, the medication dispensing tray having a plurality of compartments, the medication dispensing tray positioned into the medication dispensing device, comprising:
 a plurality of funnels positioned below the medication dispensing tray, each of the plurality of funnels aligned with a respective one of a plurality of rotational cups, the funnels dispensing medication into the respective one of the plurality of rotational cups;
 each of the plurality of rotational cups positioned along a rotational rod, the rotational rod rotated by a motor;
 wherein each of the rotational cups is in a staggered rotatable relationship with an adjacent one of the plurality of cups, each of the cups having a tab, each adjacent tab on respective adjacent rotational cup rotationally staggered;
 the dispensing device having a pulling bar affixable to a foil layer on the dispensing tray to apply a pulling force on the foil layer and incrementally remove the foil layer from the dispensing tray;
 the dispensing tray having a top surface and a plurality of compartments, a top protective layer having a plurality of pass through openings formed in a plurality of rows and a plurality of columns matching a plurality of openings in the dispensing tray, the foil layer slidable relative to the dispensing tray and the top protective layer;
 the dispensing device including a camera to detect the dispensing of medication to the dispensing area.

* * * * *